Figure 1:
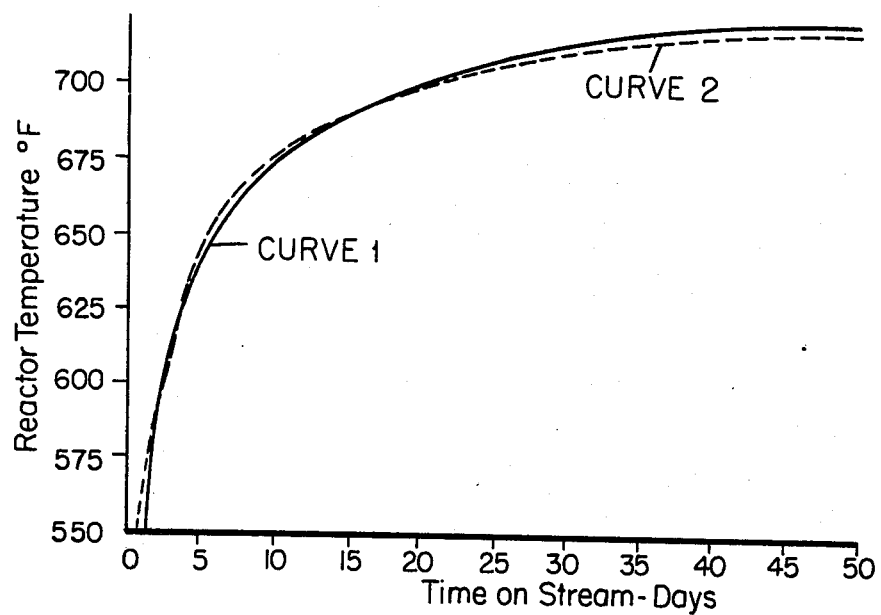

United States Patent [19]

Gorring et al.

[11] 3,980,550

[45] Sept. 14, 1976

[54] CATALYTIC HYDRODEWAXING

[75] Inventors: Robert L. Gorring, Washington Crossing, Pa.; George F. Shipman, Trenton, N.J.

[73] Assignee: Mobil Oil Corporation, New York, N.Y.

[22] Filed: Dec. 8, 1975

[21] Appl. No.: 638,386

Related U.S. Application Data

[63] Continuation-in-part of Ser. No. 539,655, Jan. 9, 1975, abandoned.

[52] U.S. Cl. ............................. 208/111; 252/455 Z
[51] Int. Cl.² .................... C10G 13/02; B01J 29/28
[58] Field of Search ..................................... 208/111

[56] References Cited
UNITED STATES PATENTS

| | | | |
|---|---|---|---|
| 3,700,585 | 11/1972 | Argauer et al. | 423/328 |
| 3,709,979 | 1/1973 | Chu | 423/328 |
| 3,766,093 | 10/1973 | Chu | 252/455 Z |
| 3,832,449 | 8/1974 | Rosinski et al. | 208/120 X |
| 3,893,906 | 7/1975 | Garwood et al. | 208/111 |
| 3,894,938 | 7/1975 | Gorring et al. | 208/111 |
| 3,894,939 | 7/1975 | Garwood et al. | 208/111 |

*Primary Examiner*—Delbert E. Gantz
*Assistant Examiner*—G. E. Schmitkons
*Attorney, Agent, or Firm*—C. A. Huggett; M. G. Gilman

[57] ABSTRACT

Improved catalytic hydrodewaxing of gas oil fractions using as the catalyst a high silica to alumina ratio crystalline aluminosilicate zeolite having shape selective properties for normal and mono methyl configuration paraffins, by using as the catalyst such a zeolite having a multi-valent transition metal and a Group VIII noble metal incorporated therewith.

7 Claims, 2 Drawing Figures

CATALYTIC HYDRODEWAXING

RELATED APPLICATION

This application is a continuation-in-part of application Ser. No. 539,655 filed Jan. 9, 1975 (now abandoned).

BACKGROUND

This invention relates to catalytic conversion and upgrading of petroleum. It more particularly refers to improvements in upgrading the gas oil fraction of petroleum.

It is known to treat gas oil fractions, i.e. petroleum fractions having an initial boiling point of at least about 330°F, so as to selectively remove paraffinic hydrocarbons therefrom. This technique is desirable in order to permit many of these fractions to meet a pour point standard. In particular, many light gas oil fractions, that is those which are used for No. 2 fuel (home heating oil) and/or Diesel fuel, have pour points which are too high to permit their intended use. A typical pour point specification is 0°F whereas it is not uncommon for such gas oil fractions to have untreated pour points of 50°F or higher.

Patents have issued on improved hydrodewaxing processes and catalysts, including U.S. Pat. No. 3,700,585 which discloses and claims such process using a ZSM-5 type zeolite catalyst. In recently filed U.S. application Ser. No. 377,157, filed July 6, 1973, now abandoned, there is disclosed and claimed an improved catalytic hydrodewaxing process which utilizes a broader range of zeolite catalysts but requires that they be present as microcrystals (up to about 0.05 microns). Recently filed Application Ser. No. 370,265, filed June 15, 1973 (now U.S. Pat. No. 3,894,938) is based upon the discovery that in typical refinery operations where gas oils are subjected to all of dewaxing, desulfurizing and denitrogenating, the operation is improved and rendered more efficient if catalytic hydrodewaxing, using the ZSM-5type and related zeolite catalysts is followed by a hydrodesulfurization treatment rathre than being preceded by such treatment as in conventional refinery practice.

Operating in the mode set forth in aforesaid Application Ser. No. 370,265 has permitted much more efficient catalyst use and, in cooperation with efficient heating and cooling sequences, is responsible for orders of magnitude increases in catalyst life between regenerations. Even with these improved efficiencies of operating, the hydrodewaxing catalyst cycle life is still less than the cycle life of the following hydrodesulfurization catalyst. This is even so, albeit to a lesser extent, if the newer microcrystalline zeolite catalysts are used for hydrodewaxing as per aforesaid application Ser. No. 377,157.

It is therefore an important object of this invention to provide an improved catalytic hydrodewaxing process.

It is a further object of this invention to provide a catalytic hydrodewaxing process having improved catalyst cycle life.

It is still further object of this invention to provide an integrated catalytic hydrodewaxing and catalytic hydrodesulfurization process in which the cycle lives of the dewaxing and desulfurizing catalysts are comparable.

Other and additional objects of this invention will become apparent from a consideration of this entire specification including the claims and drawing hereof.

In accordance with and fulfilling these objects, one aspect of this invention resides in using as the catalyst for this aforementioned catalytic hydrodewaxing process a crystalline aluminosilicate as hereinafter defined having incorporated therewith a multi valent transition element, particularly a Group IIB element such as zinc or cadmium and a Group VIII noble metal, particularly platinum, palladium or iridium. The multi valent and the noble metal should each be present in a proportion of about 0.05 to 2.0 weight percent and a cumulative proportion of up to about 4.0 weight percent (all based upon the weight of zeolite). It is not known why, but there appears to be a synergism between each of these metals with each other and with the zeolite so that the tripartite composition exhibits extremely low aging rates and the process is capable of unusually high yields of desired product.

The class of zeolites utilized in this invention has some unusual properties. These zeolites by themselves induce profound transformations of aliphatic hydrocarbons to aromatic hydrocarbons in commercially desirable yields. Although they have unusually low alumina contents, i.e. high silica to alumina ratios, they are very active even when the silica to alumina ratio exceeds 30. The activity is surprising since the alumina in the zeolite framework is believed responsible for catalytic activity. They retain their crystallinity for long periods in spite of the presence of steam at high temperature which induces irreversible collapse of the framework of other zeolites, e.g. of the X and A type. Furthermore, carbonaceous deposits, when formed, may be removed by burning at higher than usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful in this invention posess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e. they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore windows in a crystal are formed by eight membered rings of oxygen atoms, then access to molecules of larger cross-section than normal hexane is excluded and the zeolite is not of the desired type. Windows of ten-membered rings are preferred, although excessive puckering or pore blockage may render these zeolites ineffective. Twelve-membered rings do not generally appear to offer sufficient constraint to produce the advantageous conversion, although structures can be conceived, due to pore blockage or other cause, that may be operative.

Rather than attempt to judge from crystal structure whether or not a zeolite posesses the necessary constrained access, a simple determination of the "constraint index" may be made by passing continuously a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000°F for at least 15 minutes. The zeolite is then flushed with helium and the temperature adjusted between 550°F and 950°F to give an overall conversion between 10% and 60%. The mixture of hydrocarbons is passed at 1 liquid hourly space velocity (i.e. 1 volume of hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Zeolites suitable for use as catalyst for the present invention are those having a constraint index from 1.0 to 12.0, preferably 2.0 to 7.0.

The class of zeolites defined herein is exemplifed by ZSM-5, ZSM-11, ZSM-12, ZSM-21, ZSM-35, ZSM-38 and other similar material. Recently issued U.S. Pat. No. 3,702,886 describing and claiming ZSM-5 is incorporated herein by reference.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

U.S. application, Ser. No. 358,192, filed May 7, 1973 (now abandoned), the entire contents of which are incorporated herein by reference, describes a zeolite composition, and a method of making such, designated as ZSM-21 which is useful in this invention.

U.S. application Ser. No. 528,061 filed Nov. 29, 1974, the entire contents of which are incorporated herein by reference, describes a zeolite composition including a method of making it. This composition is designated ZSM-35 and is useful in this invention.

U.S. application Ser. No. 528,060, filed Nov. 29, 1974 (and now abandoned), the entire contents of which are incorporated herein by reference, describes a zeolite composition including a method of making it. This composition is designated ZSM-38 and is useful in this invention.

The x-ray diffraction pattern of ZSM-21 appears to be generic to that of ZSM-35 and ZSM-38. Either or all of these zeolites is considered to be within the scope of this invention.

The specific zeolites described, when prepared in the presence of organic cations, are substantially catalytically inactive, possibly because the intracrystalline free space is occupied by organic cations from the forming solution. They may be activated by heating in an inert atmosphere at 1000°F for one hour, for example, followed by base exchange with ammonium salts followed by calcination at 1000°F in air. The presence of organic cations in the forming solution may not be absolutely essential to the formation of this special type zeolite; however, the presence of these cations does appear to favor the formation of this special type of zeolite. More generally, it is desirable to activate this type zeolite by base exchange with ammonium salts followed by calcination in air at about 1000°F for from about 15 minutes to about 24 hours.

Natural zeolites may sometimes be converted to this type zeolite by various activation procedures and other treatments such as base exchange, steaming, alumina extraction and calcination, alone or in combinations. Natural minerals which may be so treated include ferrierite, brewsterite, stilbite, dachiardite, epistilbite, heulandite, and clinoptilolite. The preferred crystalline aluminosilicates are ZSM-5, ZSM-11, ZSM-12 and ZSM-21, with ZSM-5 particularly preferred.

In a preferred aspect, the zeolites used herein are selected as those having a crystal density, in the dry hydrogen form, of not substantially below about 1.6 grams per cubic centimeter. It has been found that zeolites which satisfy all three of these criteria are most desired. Therefore, the preferred catalysts of this invention utilize zeolites having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g. on page 11 of the article on Zeolite Structure by W. M. Meier. This paper, the entire contents of which are incorporated herein by reference, is included in "Proceedings of the Conference on Molecular Sieves, London, April 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associated with its high crystal anionic framework density of not less than about 1.6 grams per cubic centimeter. This high density of course must be associated with a relatively small amount of free space within the crystal, which might be expected to result in more stable structure. This free space, however, is important as the locus of catalytic activity.

The multi-valent transition metal may be incorporated with the zeolite by any of the well known, conventional techniques for accomplishing this, e.g. impregnation, base exchange or vapor deposition, or by an appropriate combustion thereto. The multi-valent transition metal can be used alone as such or it may be in a conventional matrix, such as with alumina, silica or silica-alumina. In matrix form the matrixing material should not constitute more than about 50 weight percent of the whole. The zeolite hereof may be of substantially any crystal size, i.e. macro or micro crystals. Alghouth micro-crystalline zeolite has previously been proposed to be superior in terms of aging, conversion and yield, it is believed that the relative merits of each are substantially unchanged in this invention.

The following examples illustrate the practice of this invention without being limiting upon the scope thereof. Parts and percentages are by weight unless expressly stated to be on some other basis.

EXAMPLES 1 AND 2

Arab medium gas oil having a 10/90 percent boiling range of 512° to 783°F and containing 2.47% sulfur was converted from a 48°F pour point material to a 330°F+ product having about a 0°F pour point in two (2) substantially identical series of runs. Operating conditions for both sets of runs were 100 psig, 2.0 LHSV and 2500 SCFB hydrogen. The first set of runs used microcrystalline HZSM-5 and the second set of runs used an identical catalyst modified only by the incorporation of 0.76% nickel. These two catalysts seemed to perform substantially identically, at least within experimental error, as is shown in FIG. 1 of the drawing hereof. In this FIG. 1, curve 1 is based on data from the HZSM-5 test and curve 2 is based on data from the NiZSM-5 test.

Figure 2:
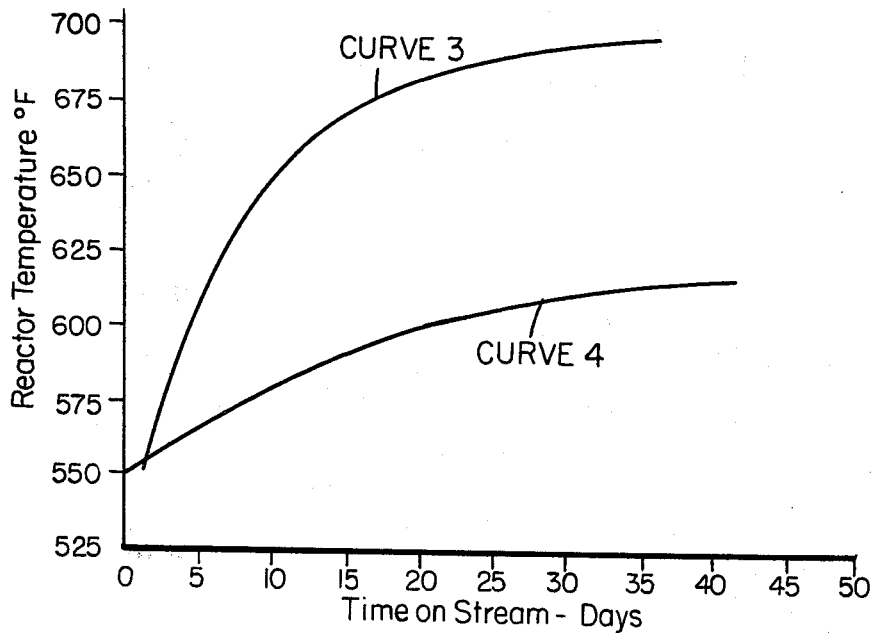

FIG. 2 of the instant drawing also has two curves. Curve 3 shows an aging rage for HZSM-5 and curve 4 shows an aging rate for Zn/Pd ZSM-5. These data are based upon runs as for FIG. 1. HZSM-5 aged at a rate of 1.8°F per day and Zn/Pd ZSM-5 aged at a rate of 0.8°F per day.

These data substantiate the fact that in some unknown manner Zn/Pd ZS -5 performs better than NiZSM-5, which might have been though to be equivalent, and HZSM-5. A comparison of these curves in FIG. 2 also shows that the reactor temperature necessary for achieving relatively level catalyst deactivation for the HZSM-5 is about 675°F whereas an equivalent steady operation with the ZnPd/ZSM-5 was achieved at about 585°F, an indication of about 90°F higher activity for the ZnPd/ZSM-5 catalyst for this process.

What is claimed is:

1. In the process of dewaxing gas oil which comprises contacting such at an elevated temperature with an aluminosilicate zeolite catalyst having a silica to alumina ratio of at least about 12, a constraint index of about 1 to 12 and a crystal density of not substantially below about 1.6 grams per cubic centimeter whereby to reduce the pour point of said gas oil; the improvement which comprises utilizing a catalyst comprising said zeolite having at least one multi valent transition metal and at least one Group VIII noble metal incorporated therewith.

2. The improved process claimed in claim 1 including operating under hydrogen pressure.

3. The improved process claimed in claim 1 wherein at least one multi valent transition metal is present in a proportion up to about 2.0 weight percent, at least one Group VIII noble metal is present in a proportion up to about 2.0 weight percent, and both at least one multi valent transition metal and at least one Group VIII noble metal are present in a cumulative proportion up to about 4.0 weight percent all based upon the weight of the zeolite.

4. The improved process claimed in claim 1 wherein said zeolite is ZSM-5.

5. The improved process claimed in claim 1 wherein said multi valent transition metal is zinc or cadmium.

6. The improved process claimed in claim 1 wherein said Group VIII transition metal is platinum palladium or iridium.

7. The improved process claimed in claim 1 wherein said multi valent transition metal is zinc or said Group VIII noble transition metal is palladium.

* * * * *